> United States Patent [19]
> Heurtier

[11] 4,054,253
[45] Oct. 18, 1977

[54] CINEMATIC PROJECTOR WITH INTEGRAL TAKE-UP REEL

[75] Inventor: Antoine Heurtier, Saint-Etienne-Loire, France

[73] Assignee: Etablissements Heurtier et Cie-Societe anonyme-, Saint-Etienne-Loire, France

[21] Appl. No.: 648,746

[22] Filed: Jan. 12, 1976

[30] Foreign Application Priority Data

Jan. 13, 1975 France ............................... 75.01363
July 31, 1975 France ............................... 75.25582

[51] Int. Cl.² ............................................. G03B 1/02
[52] U.S. Cl. ................................. 242/205; 242/192; 242/195; 352/124; 352/157
[58] Field of Search ....................... 242/205, 192, 195; 352/124, 173, 157

[56] References Cited

U.S. PATENT DOCUMENTS 2,207,075 7/1940 Sperry .................................. 242/205
3,016,210 1/1962 Ecker et al. ......................... 242/205

Primary Examiner—George F. Mautz

[57] ABSTRACT

A cinematic projector having a reversible drive motor and a drive shaft driven by the drive motor with a pivotably mounted control assembly constituted of a plurality of pinions in mesh with one another and movable between first and second positions for drivingly engaging the drive shaft. In the first position, the control assembly transmits drive from the drive shaft for forward and reverse drive of the film respectively according to the direction of drive of the drive motor while in the second position the control assembly transmits drive from the drive shaft in forward motor drive. An operating assembly is drivingly coupled to the control assembly for engaging the film on the internal reel for rewinding the film from the internal reel to the external reel only when the control means is in the second position.

27 Claims, 22 Drawing Figures

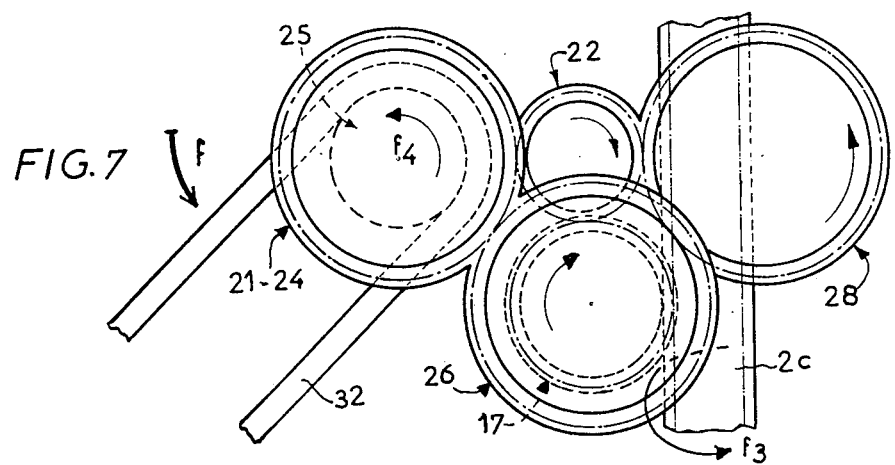
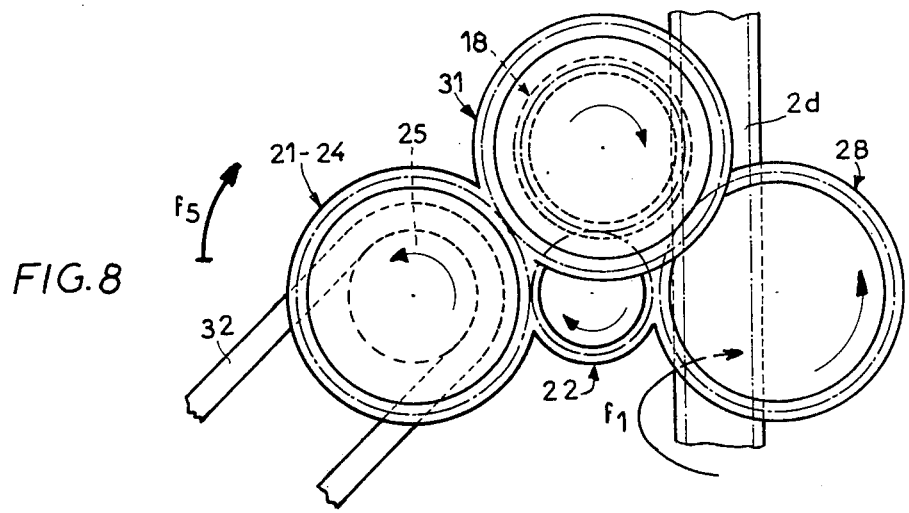
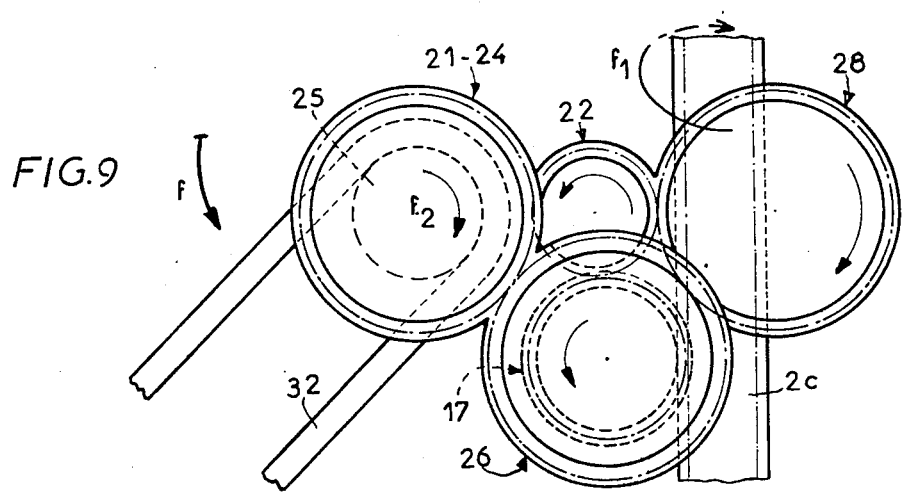

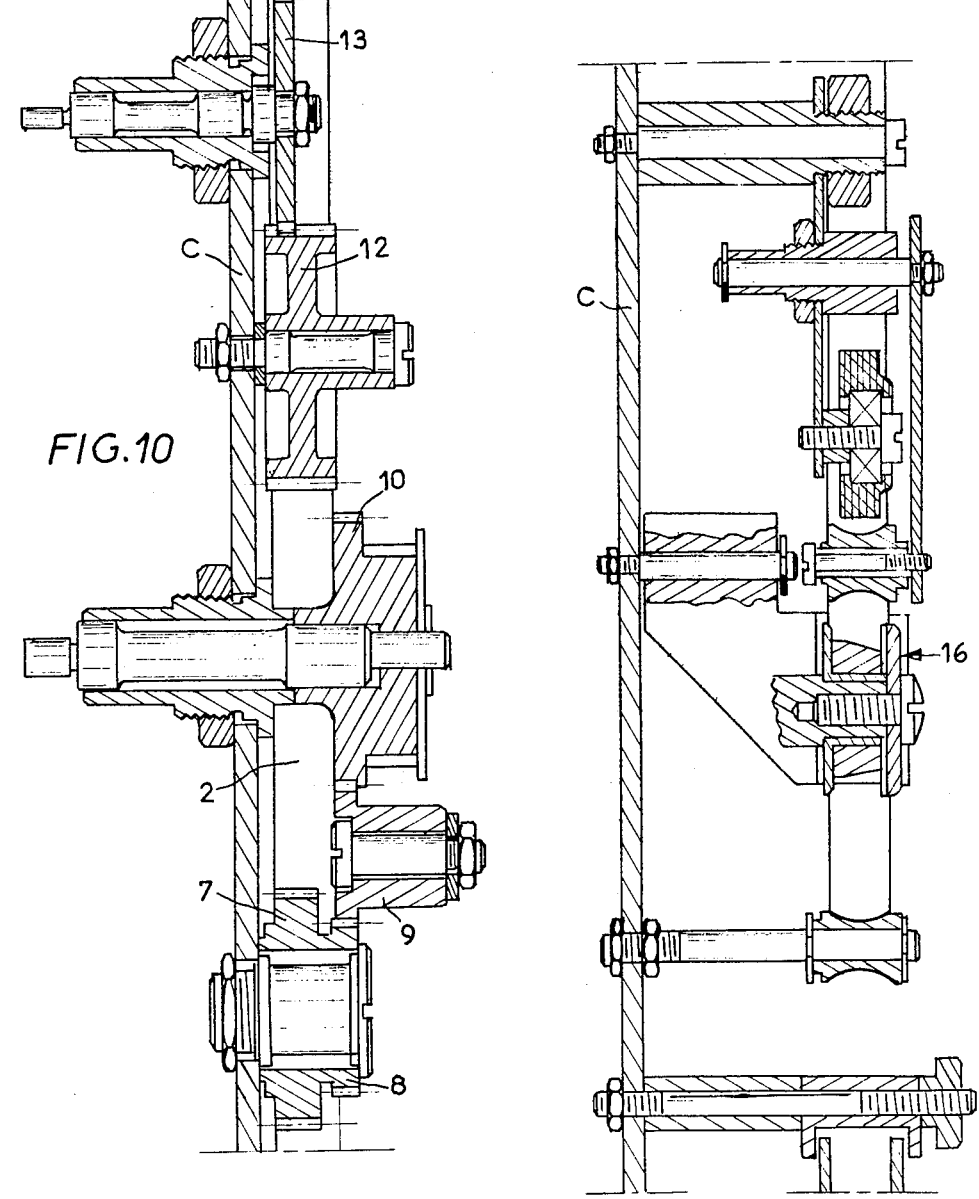

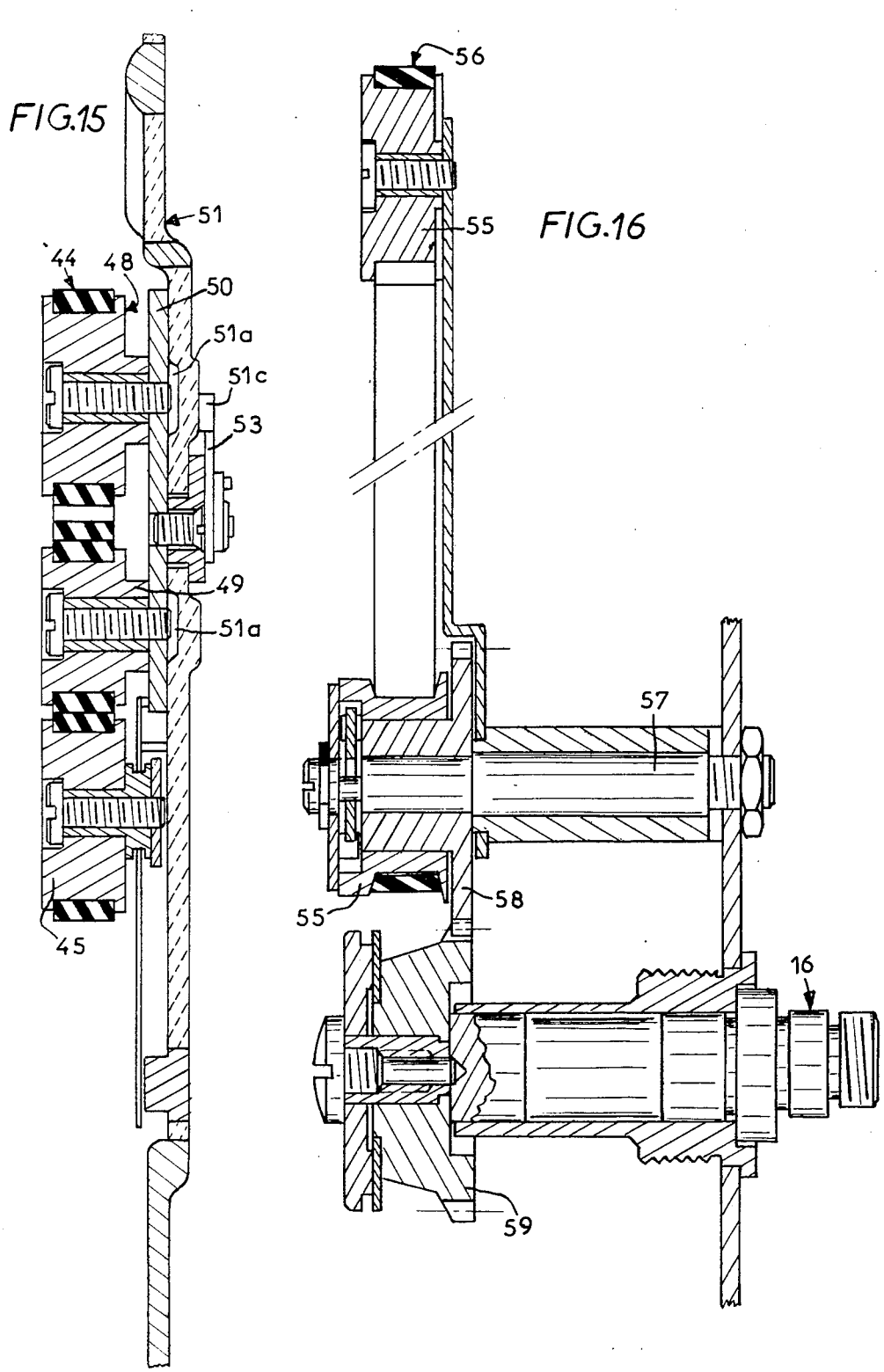

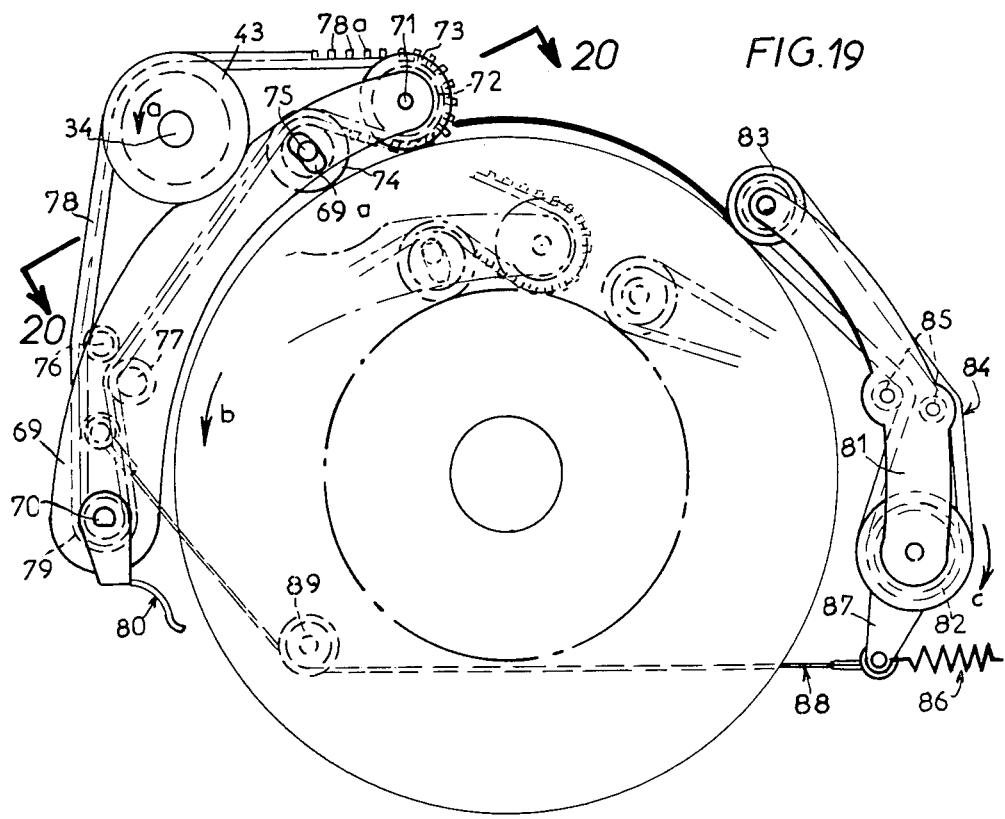
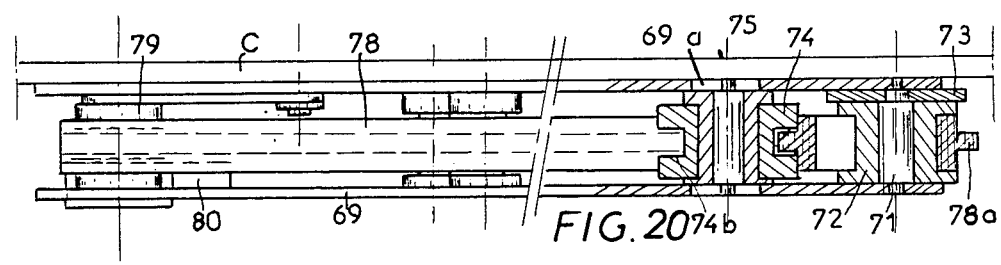
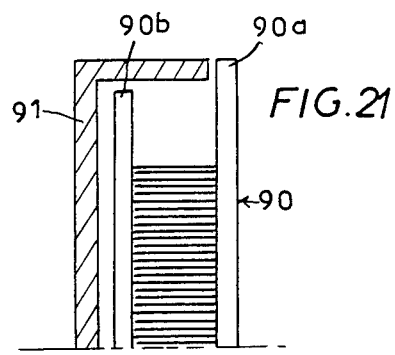
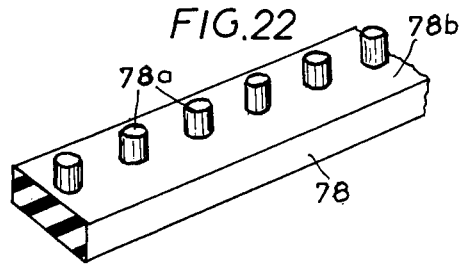
FIG.19
FIG.20
FIG.21
FIG.22

CINEMATIC PROJECTOR WITH INTEGRAL TAKE-UP REEL

FIELD OF THE INVENTION

The invention relates to a cinematic projector with an integral reel, and particularly to cinematic projectors with or without sound.

SUMMARY OF THE INVENTION

An object of the invention is to provide a silent or sound cinematic projector having novel means for drive of the film in the different phases of operation and a reel integrated in the apparatus serving for take-up of film, the projector having an articulated arm for an external film supply reel in known manner.

The projector, according to the invention, is characterized in that it comprises a reversible drive motor, a drive shaft driven by said drive motor, an internal take-up reel, support means for an external film supply reel, a pivotably mounted control means movable between first and second positions for drivingly engaging said drive shaft, and in said first position transmitting drive from said shaft for forward and reverse drive of the film respectively according to the direction of drive of the drive motor, and in said second position the motor being in forward drive, and operating means drivingly coupled to said control means for engaging the film on said internal reel and rewinding the film on the external reel when the control means is in said second position.

According to a variant, the operating means comprises a roller for contact with the film controlled by a belt and pulleys from the control means and mounted on an oscillating arm, the contact roller being adjustable in position.

BRIEF DESCRIPTION OF THE DRAWING

FIGS. 7, 8 and 9 are partial schematic views, respectively showing the control means in the phases of reverse drive, rewind and forward drive.

FIG. 10 is a developed sectional view taken along broken line 10—10 in FIG. 4, showing the mounting of the pinions for control of the feeders.

FIG. 11 is a developed sectional view taken along broken line 11—11 in FIG. 2, showing the driving of the film from the objective to the internal take-up reel.

FIG. 15 is a sectional view taken along line 15—15 in FIG. 3, showing the mounting of the rewinding mechanism.

FIG. 16 is a sectional view taken along line 16—16 in FIG. 3, showing the mounting of the drive arm for the film in the rewinding phase.

FIG. 19 is a schematic view showing a variation of the control means for rewinding in two extreme positions.

FIG. 20 is a sectional view taken along line 20—20 in FIG. 19.

FIG. 21 is a partial sectional view showing the construction of the internal take-up reel.

FIG. 22 is a perspective view illustrating a portion of the drive belt in FIGS. 19 and 20.

DETAILED DESCRIPTION

Figure 1:
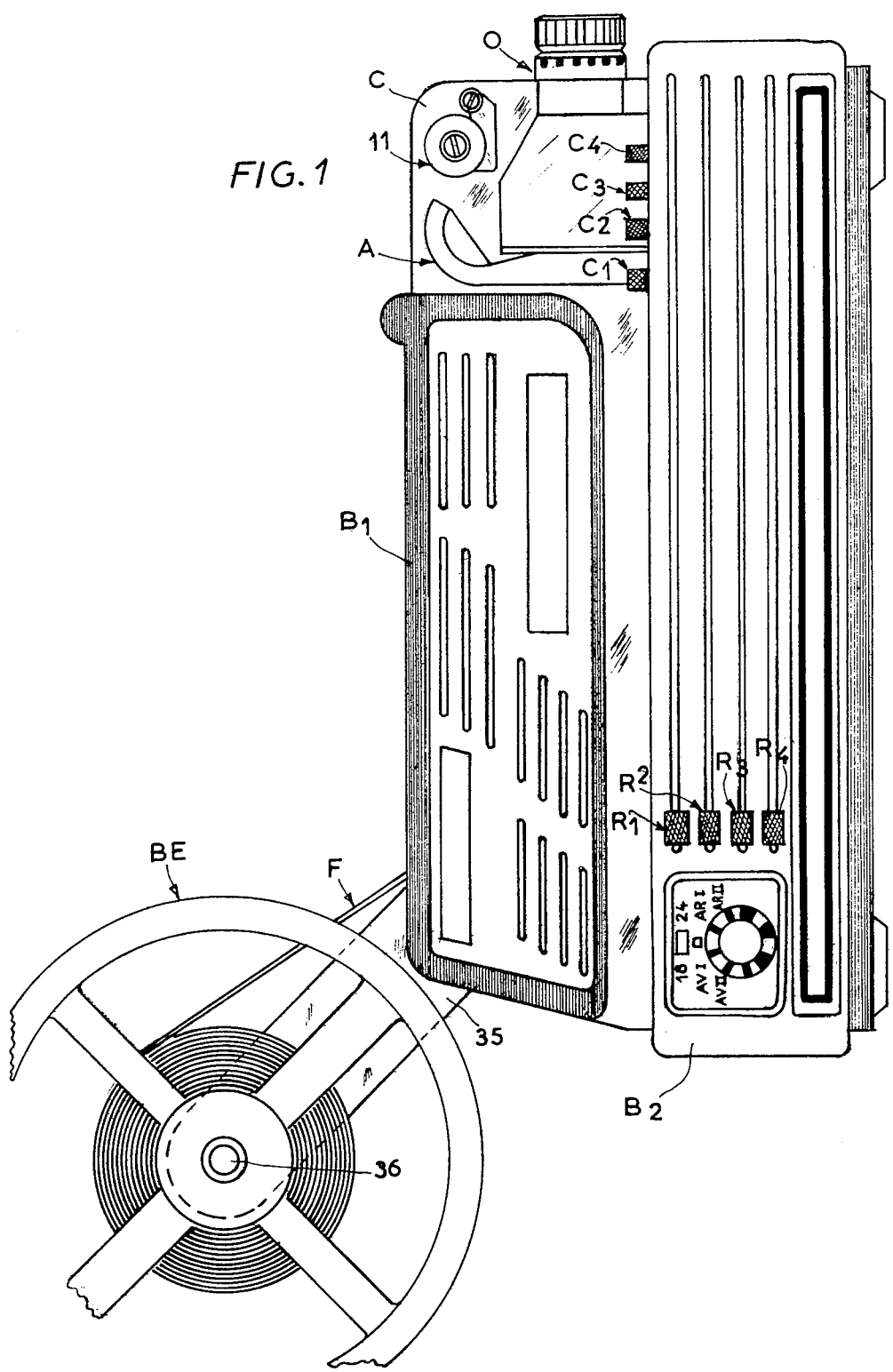
FIG. 1 is a general side view of the projector according to the invention, shown in the course of rewinding of the film.

In order to render the objects of the invention more concrete, there will now be described in non-limitative manner, one embodiment illustrated in the figures of the drawing.

The projector, according to the invention, has an electrical motor 1 coupled to a general drive shaft 2 by pulleys 3,4 and belt 5. The shaft 2 is supported by bearings 6 and has four threaded sleeves 2a, 2b, 2c, 2d, thereon adapted to mesh with control pinions for different members as will be explained hereafter.

The sleeve 2a transmits rotational drive to a pinion assembly 7,8,9 and 10, pinion 10 driving in rotation an upper film feeder 11 which feeds the film into the projector. The sleeve 2b is coupled to a pinion assembly 12, 13, 14 and 15, and pinion 13 drives a lower film feeder 16 which feeds the film onto an internal take-up reel.

Figure 12:
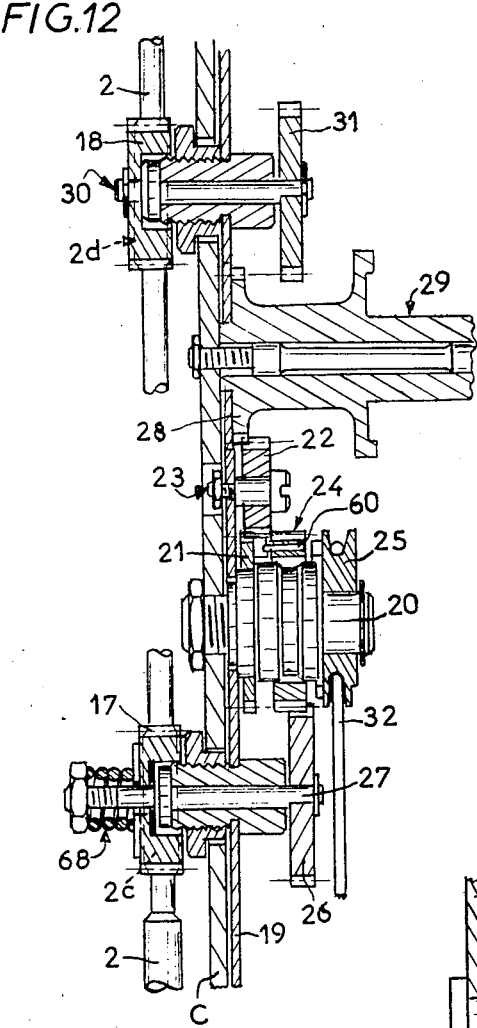
FIG. 12 is a developed sectional view taken along broken line 12—12 in FIG. 6, showing the mounting of the central control means.

The sleeves 2c, 2d are separated by a smooth portion and sleeves 2c, 2d have opposite thread directions, one being left handed and the other right handed. The sleeves 2c and 2d are alternatively coupled respectively with pinions 17 and 18, which in cooperation with other pinions to be described hereafter constitute the central control means for forward, reverse and rewinding operations. This central control means comprises, as can be seen in FIG. 12, a plate 19 mounted on axle 20 secured to casing C of the projector. A pinion 21 is mounted on axle 20 and and meshes with a pinion 22 mounted on an axle 23 on plate 19.

A pinion 24 and a pulley 25 are also mounted on axle 20. The pinion 24 can mesh with a pinion 26 mounted on an axle 27 on which is secured the pinion 17 cooperating with the sleeve 2c. The pinion 22 is in mesh with a pinion 28 formed on a fixed axle 29 carrying the internal or take-up reel. A pawl 60 is interposed between the pinion 21 and the pulley 25 to assure its drive in one direction only. The pawl 60 is slidable in an axial groove in pinion 21 and has inclined extremities for cooperating with the pinion 22 and the pulley 25.

The pinion 18 adapted to cooperate with the sleeve 2d, is carried by an axle 30 mounted on the plate 10 and on which is mounted a pinion 31 which can mesh with the pinion 24.

By virtue of the mounting of plate 19 on axle 20, the axles 27 and 30, respectively carrying the pinions 17-26 and 18-31 can rock under the action of a conventional control (not shown). There will be explained later the rocking actions for a change in the direction of drive.

Figure 13:
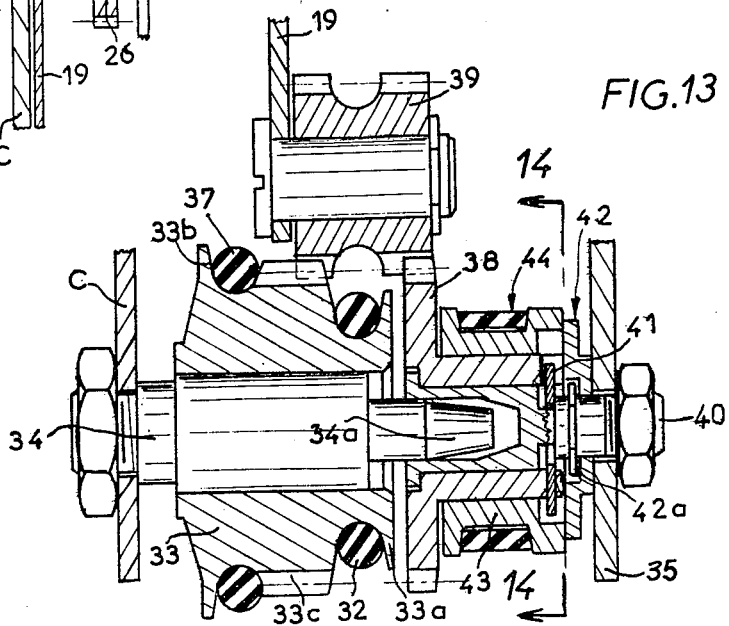
FIG. 13 is a sectional view taken along line 13—13 in FIG. 3, showing the mounting of the control axle of the rewinding mechanism for the operation of the external supply reel.

With reference to FIG. 12, it is seen that the pulley 25 mounted on the axle 20 is connected by a belt 32 to another pulley 33a (FIG. 13) formed on a hub 33 and mounted on an axle 34 fixed to the casing C which axle serves as the axis of articulation, with friction, of arm 35 carrying the external supply reel BE. The reel BE is driven in rotation on its axle 36 (FIG. 1) by a belt 37 wound on an outer pulley 36a (FIG. 3) and on an inner pulley 33b formed on the hub 33 (FIG. 13).

Figure 2:
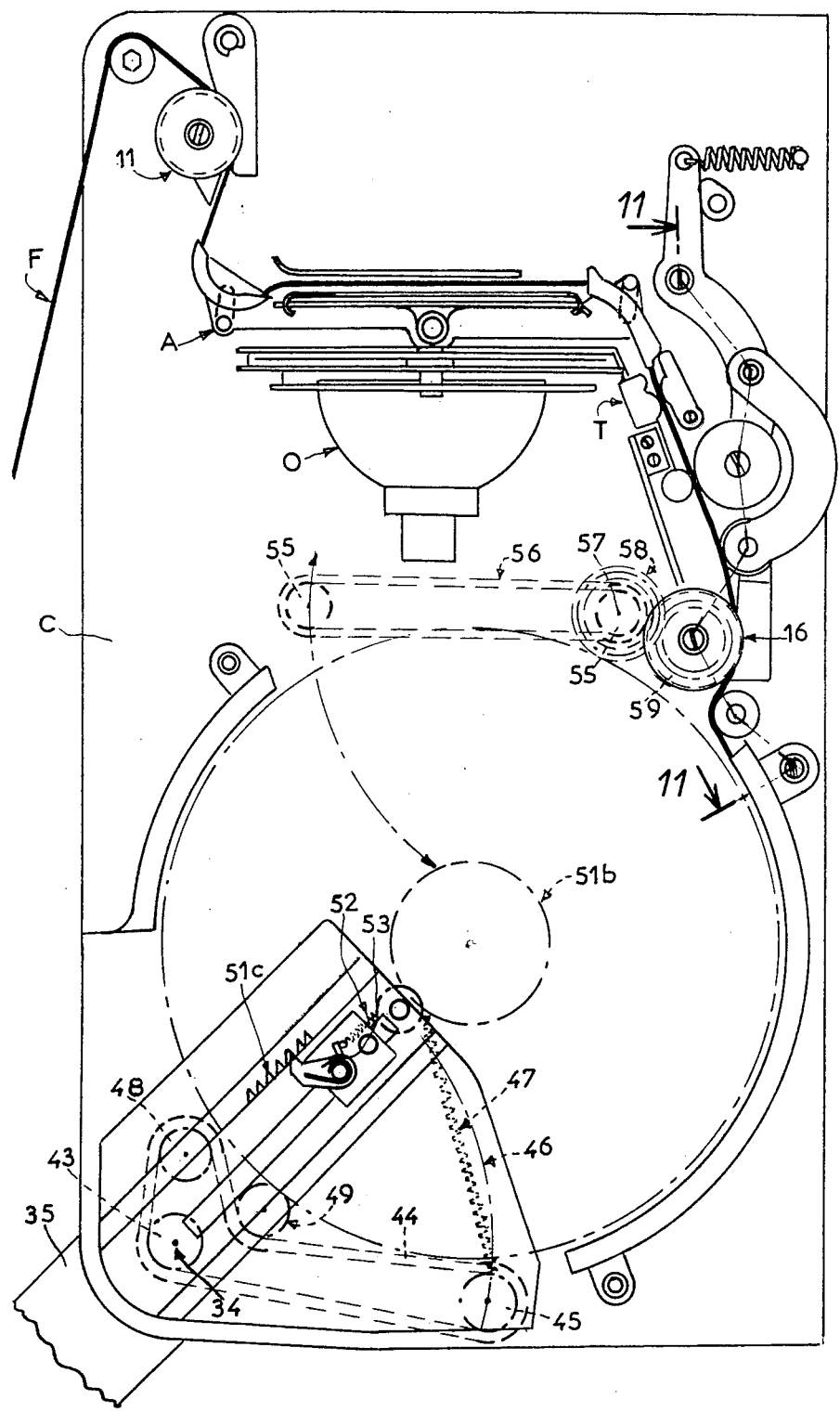
FIG. 2 is a front view of the projector, according to the invention, with the cover removed and shown in forward drive position.
Figure 3:
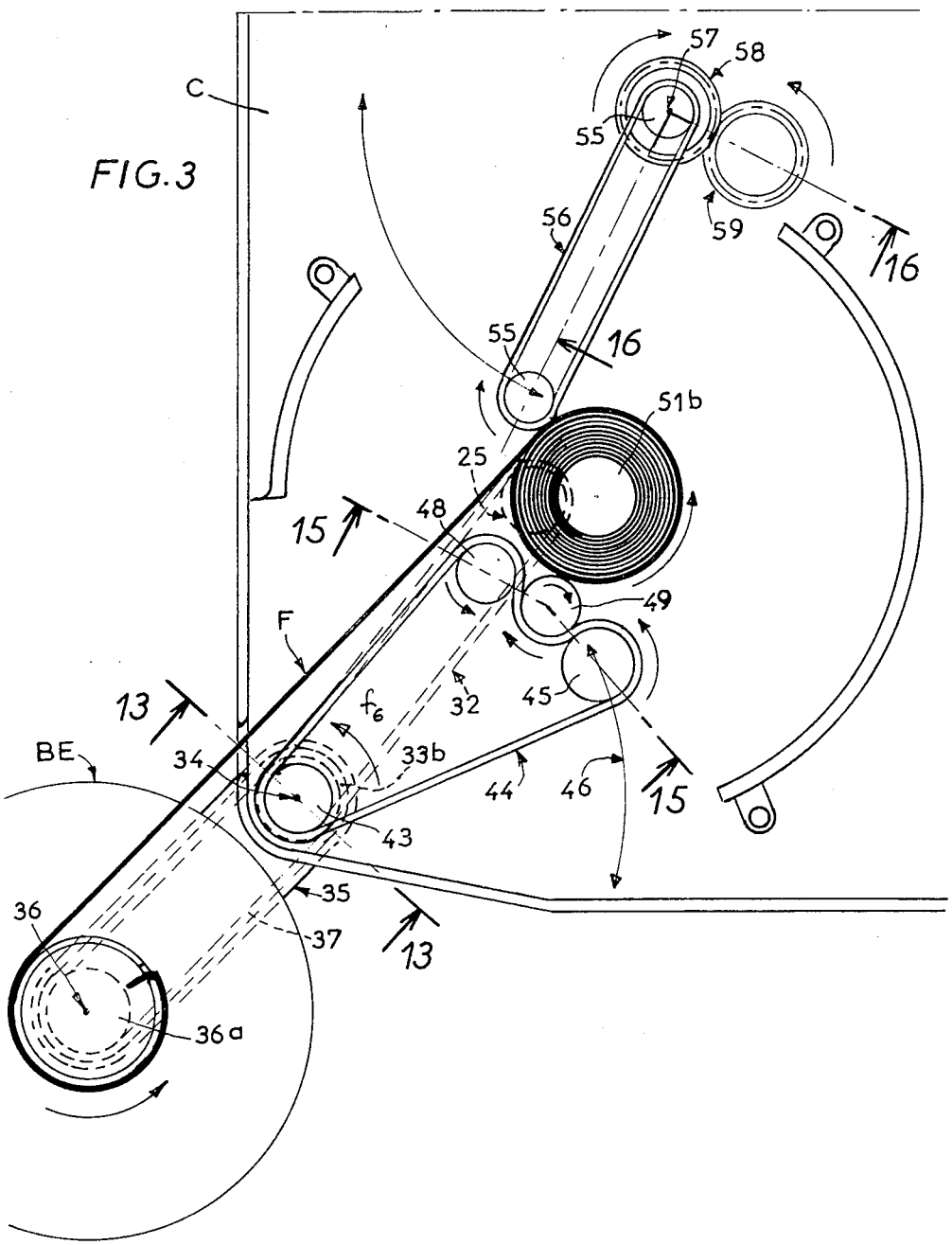
FIG. 3 is a front view partially illustrating the drive assembly of the film in the rewinding position.
Figure 14:
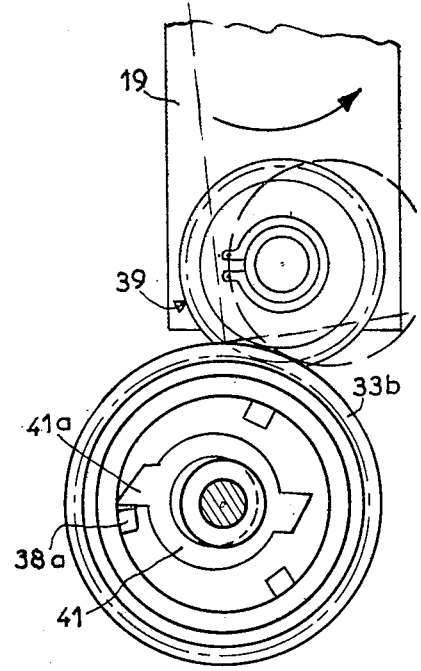
FIG. 14 is a sectional view taken along line 14—14 in FIG. 13, showing the uni-directional drive pawl and the clutch pinion of the rewinding mechanism.

The axle 34 has a conical projecting portion 34a on which is centered a pinion 38 having the same number of teeth as a pinion 33c formed on the hub 33 between the pulleys 33a and 33b. In the alignment of these pulleys, as shown in FIG. 13 and 14, there is placed a pinion 39 carried in free rotation by one extremity of the plate 19 of the central control means, in order to simultaneously mesh with the two pinions 33c, 38 when the central control means is rocked for a rewinding operation. In order to avoid rotation of the pinion 38 during reverse drive when the rocking of the control means is on the same side as for the rewinding operation, there is provided, between the axle 40 rotatably supporting the pinion 38 and the pinion itself, a pawl 41 assuring unidirectional drive by engagement of projections 41a with the projections 38a on the pinion 38 and projections 42a on a ring 42 carried by the axle 40 as shown in FIGS. 13 and 14. On the body of the pinion 38 is engaged with force, a pulley 43, adapted to drive an elastomeric belt 44 which is wound on a follow-up pulley 45 (FIGS. 2, 3 and 15) slidably mounted in a slot 46 in the form of an arc of a circle and shown in phantom lines in FIG. 2. The arc of slot 46 has its center on the common axis of axle 40 and axle 34. The pulley 45 is constantly urged towards the axle of the internal take-up reel by a spring 47 (FIG. 2). The belt 44 is also wound on a pulley 48, and around wheel 49 as shown in FIGS. 2 and 3, in a manner inverse to the direction of passage of the belt.

The pulley 48 and the wheel 49 are mounted for free rotation on a plate 50 (FIG. 15) slidably guided in grooves 51a formed on the larger flange constituting the integrated internal take-up reel. A spring 52 assures the return of the plate 50 towards the center of said reel (FIG. 2). The positions of the pulley 48 and of the wheel 49 are such that the wheel 49 is always in contact with the wound film on the hub 51b of the flange 51, whereas the pulley 48 is displaceable.

A pawl 53 of the plate 50 cooperates with teeth 51c formed on the flange 51 and is oriented in order to effect the disconnection of the system with respect to the film (FIG. 2).

Figure 5:
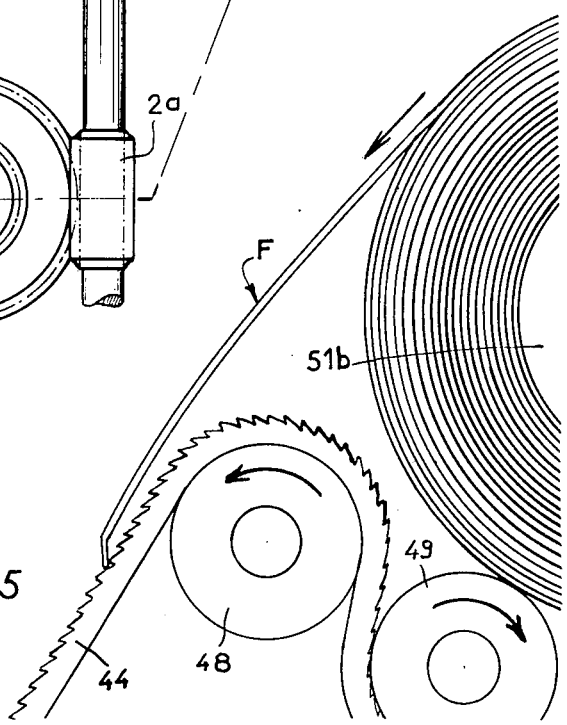
FIG. 5 is a partial view on much greater scale, showing the beginning of the rewinding operation.

In order to easily effect the rewinding of the film without any slippage, buckling or other movement of the film, the belt 44 is formed with a smooth side (the lower side engaged on pulleys 45 and 48), the other side having thin, inclined teeth (FIG. 5) capable of flattening during passage on the wheel 49, and then reforming themselves. It is understood that when the film, driven by the wheel 49, arrives on the belt 44, the film is then driven by the teeth as shown in FIG. 5. Additionally, when a small diameter of film is wound on the hub 51b, in order to avoid buckling or jamming of the film between the wheel 49 and its exit to belt 44, an additional system (FIGS. 2, 3 and 16) is provided pivotably mounted on an arm and driven in rotation by pulleys 55 and a belt 56 from an axle 57 fixed to the casing C. The belt 56 is itself driven from a pinion 58 which meshes with another pinion 59 mounted on the axle of the lower film feeder 16 (FIG. 16).

The system can be automatically disconnected by any known means, at the time of forward projection drive or at the end of the wind-up of the film on the external reel.

Figure 17:
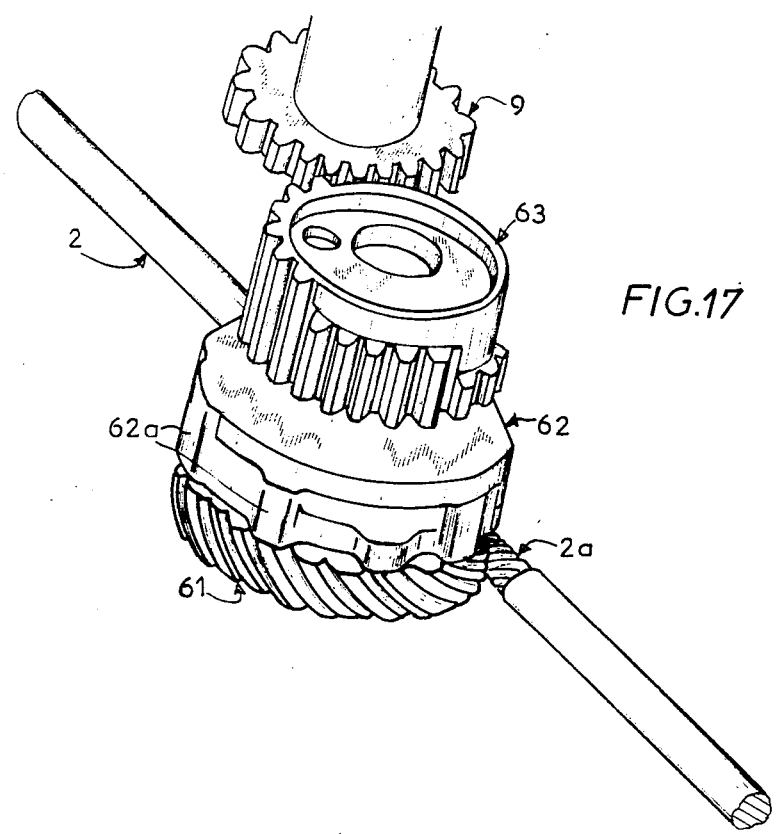
FIGS. 17 and 18 are views respectively in perspective and in section, of apparatus for variation of the slow-down speed of the projector.
Figure 18:
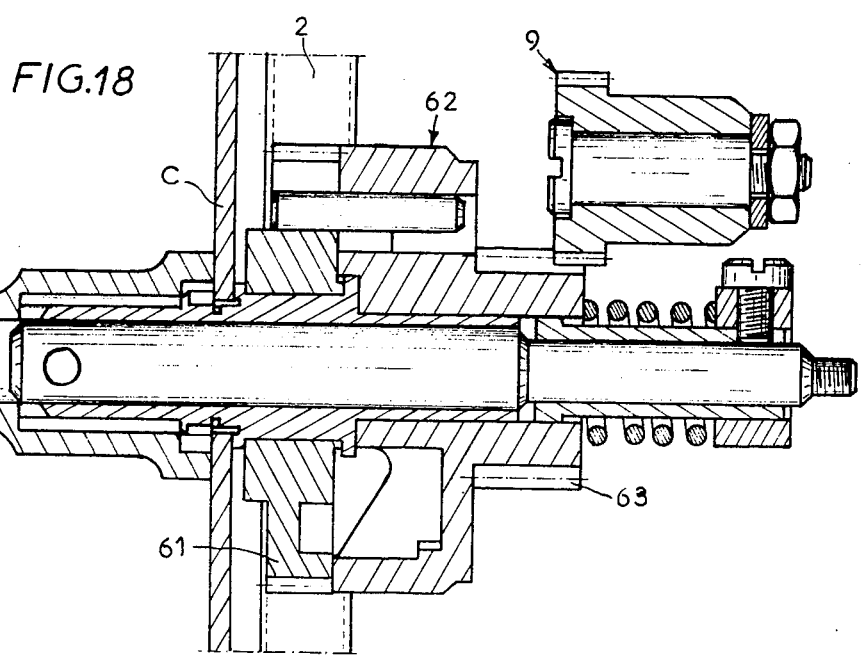

In the case of silent movie projectors, there is further provided in association with the drive motor, an apparatus for variation of the projection speed, as illustrated in FIGS. 17 and 18. The pinion 7, cooperating with the sleeve 2a of the main control shaft 2 is replaced by a fixed assembly as shown in FIGS. 17 and 18 comprising a pinion 61 cooperating with the sleeve 2a on the shaft 2, a cam 62 having on different portions of its perimeter and on all or a portion of its length bosses 62a cooperating with the drive dogs of the film and with a pinion 63 which also presents on different portions of its width, teeth of different number and in suitable relation with the bosses on the cam. By axially displacing the assembly with respect to the pinion 9, there is simultaneously modified, in synchronism, the frequency of the drive of the dog and the speed of drive of the feeder.

Figure 4:
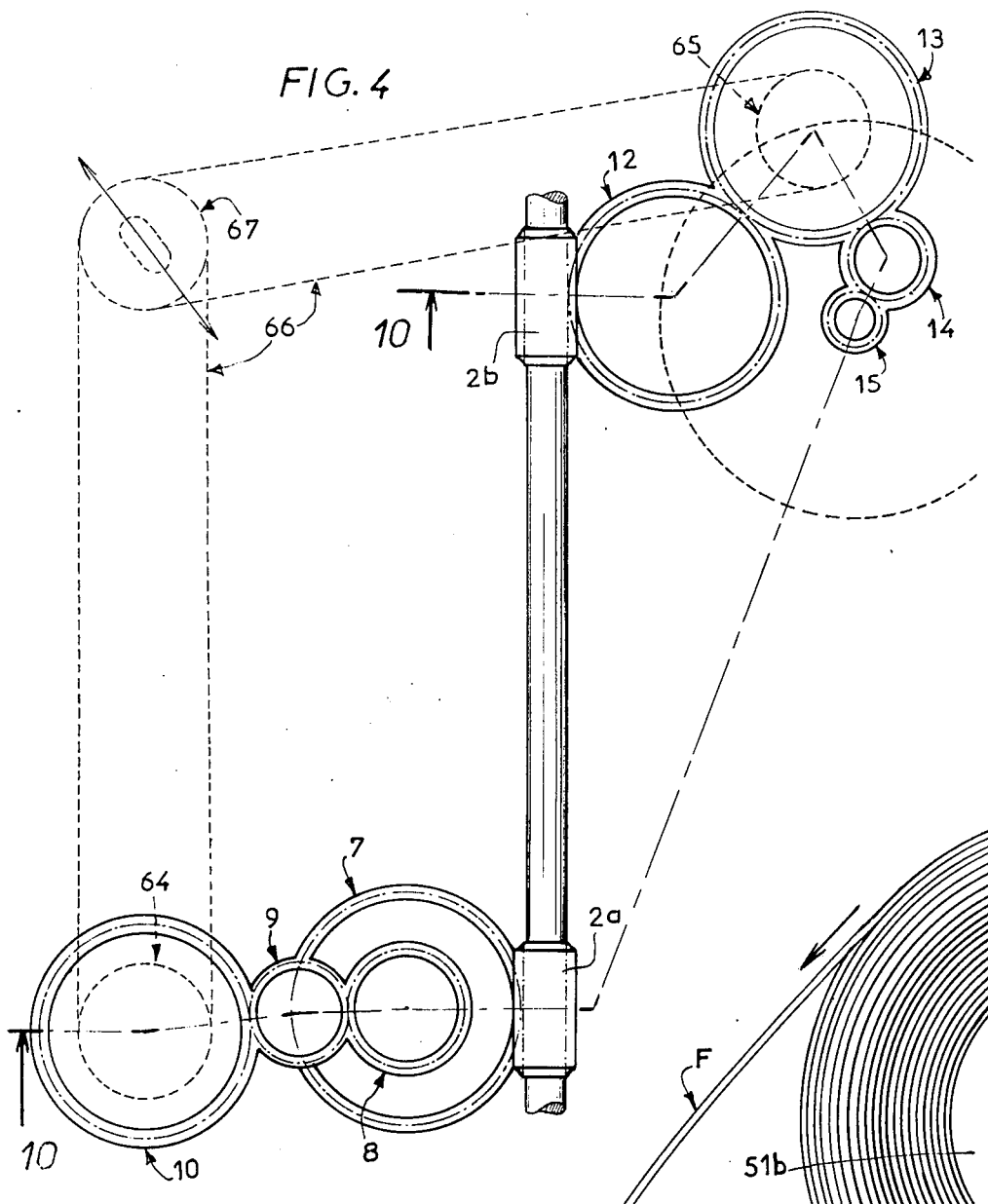
FIG. 4 is a schematic view showing the control of upper and lower film feeders.

In the case of the silent movie projector, the pinions for control of the lower feeder are eliminated and the feeders are driven by a belt. There is seen, for example, in FIG. 4, in dotted lines, pulleys 64 and 65 for the upper and lower feeders, respectively, connected by belt 66 to a double pulley 67 which is adjustably mounted. A single belt can also connect the pulleys 64 and 65 through the intermediary of an adjustable tensioning idler.

The operation of the projector will next be described referring to the different figures of the drawing.

Figure 6:
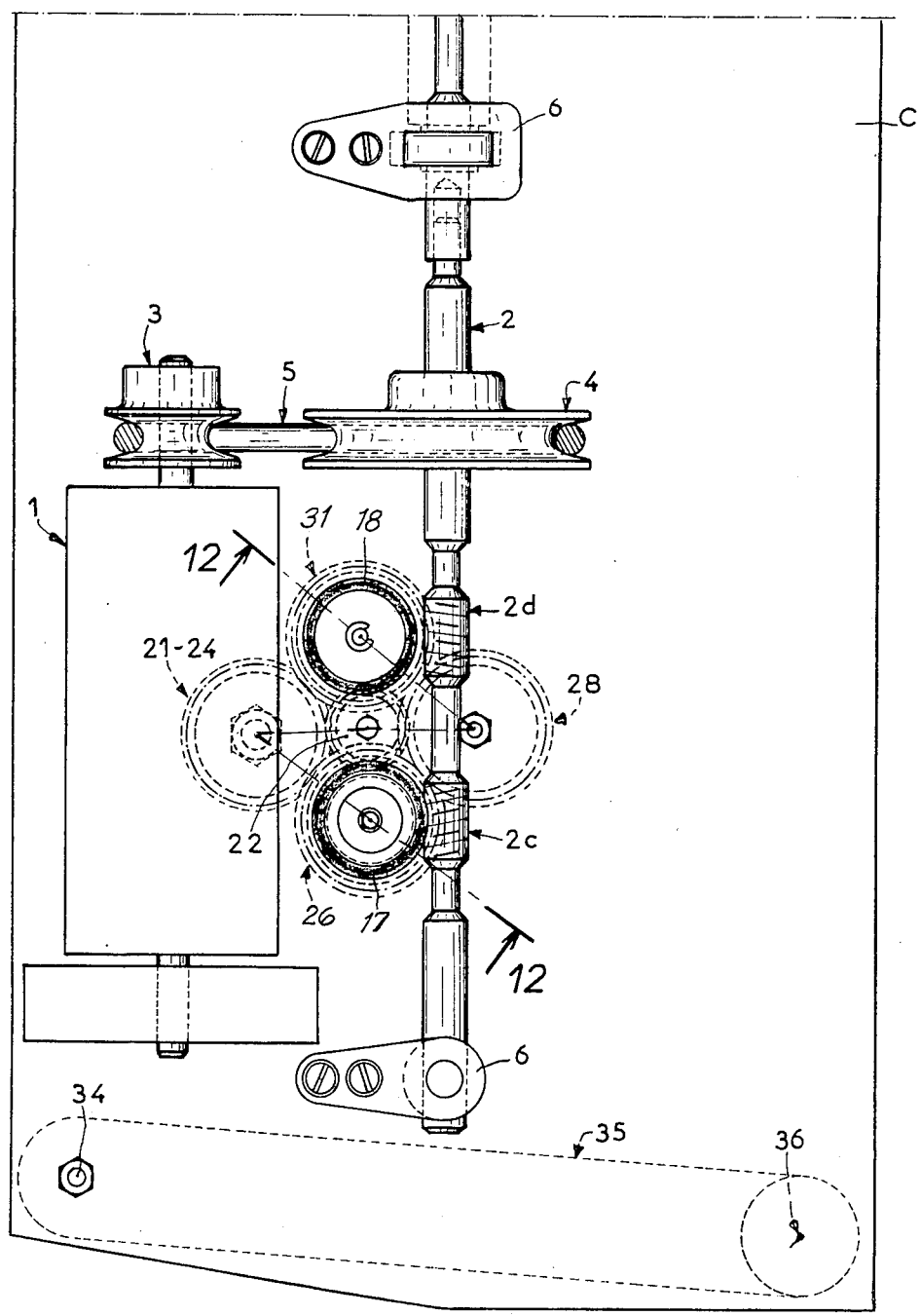
FIG. 6 is a side view of the motor and central control means.

The film F to be projected, mounted on external supply reel BE, is placed on the axle 36 on the pinion arm 35. The central control means is placed in forward drive position (this is illustrated in FIGS. 1, 6 and 9), i.e. the pinion assembly carried on the plate 19 is rocked in the direction of arrow f in FIG. 9. The drive pinion 17 is coupled to the motor shaft which turns in the direction of the arrow $f1$. The right hand thread on sleeve 2c drives the pinions 26, 24, 21, 22 and 28, in the directions as shown and the external reel rotates in the direction of the arrow $f2$, thus permitting the feed of the film which is engaged in an automatic manner in the upper feeder 11, the film passing in front of the objective 0 where it is engaged by the drive dogs, then engaging itself with the reader heads T (FIG. 2) and arriving at the lower feeder 16 before winding on the internal take-up reel.

Additionally, an adjustable friction device 68 (FIG. 12) is mounted on the axle 27 between the pinions 17 and 26 and the pinion 21 is driven by the pawl of the pinion 24 which does not drive the pulley 25 and thereby, the external reel, but only the internal reel. To go to reverse drive, it is sufficient to reverse the direction of rotation of the motor to arrow $f3$ (FIG. 7) without changing the position of the central control means. During this operation, the reader heads T are moved away and the film is driven by the lower feeder. Additionally, pinions 17 and 26 are frictionally adjustable, the pinions 22 and 29 are free in rotation and the pawl escapes from the pinion 21, but drives the pulley 25 and, thereby, the external reel in the direction of arrow $f4$ (FIG. 7).

To effect the rewinding of the film on the external reel, the motor turns in the direction of forward drive (arrow $f1$) but the central control means is rocked in the direction of arrow $f5$ (FIG. 8) such that the pinion 18 engaged the sleeve 2d with the left-hand thread which, by the action of the forces, assures the maintenance of the engaged position.

In this configuration, the pinions 22 and 29 are free in rotation, the pinion 31 drives the pinion 24 which, by its pawl, drives the pulley 25 and thereby, the external reel.

Simultaneously with the rocking of the central control means, the rewinding apparatus is engaged by a conventional control permitting the liberation of the plate 50 carrying the pulley 48 and the friction wheel 49.

In this phase, the pulley 25 is driven by its pawl 60. The belt 32 effects the rotation of the pulley 33a, 33b on the hub 33 in the direction of arrow f6 (FIG. 3). The belt 37 thus drives the external reel BE, the toothed belt 44 being also driven by the engagement of the pinion 39 with the pinions 33c and 38 and drives the friction wheel 49. The film F wound on the hub 51b of the flange is driven in the direction of the arrow (FIG. 3) and passes under the pulley 55 which also drives it, and the film lowers itself onto the teeth of the belt 44 and leaves the apparatus through an appropriate opening in the casing. The film is then engaged on the external reel, either manually or in automatic manner.

Of course, the other elements of the apparatus which are illustrated for the understanding of the operation are considered as known. This is the case, notably, of the automatic feed A, the controls C1, C2, C3, C4 . . . , the objective O, the heads of the reader T, the covers and casings B1, B2 . . . It is to be noted that to improve the utilization and the precision of the controls, there is provided, as illustrated in FIG. 1, slide adjusters R1, R2, R3, R4 for certain controls. These arrangements in combination with the novel forms of the apparatus improve the appearance and reduce the complexity.

According to a variation illustrated in FIGS. 19, 20 and 21, the assembly for control of the rewinding omits the construction on the axle 34 of the pulley with two grooves respectively connected by belts to the central control means and to the external reel. This axle is prolonged to carry a pinion on which is affixed a drive pulley 43, adapted to drive a belt of the rewinding assembly in the direction of arrow a.

This assembly comprises an arm 69 pivotably mounted on an axle 70 on the casing C, slightly below the axis of rotation of the internal reel. At the extremity opposite axle 70, the arm carries in free rotation on axle 71 a pulley 72 and a washer 73. In proximity to this pulley, there is also freely mounted another pulley 74 which can slide on its axle 75 through an oblong opening 69a in arm 69.

Two further pulleys 76, 77 are mounted on arm 69 for free rotation between flanges of the arm in order to produce tension of endless belt 78 which is wound on the drive pulley 43, then passes on guide pulley 76, then is wound on pully 79 mounted for free rotation on the axle 70, the belt 78 then passing on the guide pulley 77 to the adjustable pulley 74 and finally around the pulley 72 and back to the drive pulley 34.

Thus tensioned and wound, it is seen that the belt 78 constantly causes the pulley 74 to bear on the film wound on the internal reel to drive it in the direction of arrow b. The extremity of the film arriving in proximity to the extremity of the arm, is displaced by the belt at pulley 72 which causes the film to ascend and exit from the apparatus and wind itself on the external reel.

To facilitate this wind-up action of the film, the belt 78 has fingers 78a on one face suitably dimensioned, taking into account the material, in order to be able to bend in contact with the wound film, but sufficiently rigid to push the extremity of the unwound film.

To permit the passage of the fingers on the belt on the pulley 74, the pulley 74 has a groove 74b, the surface 78b of the belt bearing on the flanges of the pulley 74 bounding groove 74b.

As is seen in FIG. 19, whatever the diameter of film wound on the internal reel, the pulley 74 is always in contact with the film by sliding of its axle 75 in the oblong opening 69a, under the effect of the tension of the belt.

It is to be also noted that the washer 73 freely turning on the axle 71 at the extremity of the arm is in contact with the film and it is driven by it.

It is further seen that on the pivot axle 70 of the arm, there is mounted a lever 80 adapted for manual engagement to put the arm in position for unwinding. This action on the lever can be maintained during the entire time of rewinding, the arm elastically returning to the rear position when one releases the lever, or the lever can be combined with a conventional release system providing elastic bearing of the pulley 74 on the film during rewinding and automatically effecting rearward return of the arm when the same is at the bottom of its travel, or it can be manually displaced to the disengaged position.

As in the preceding embodiment, to avoid the formation of buckles in the film during winding and unwinding, especially in the case of smaller winding diameters, it is necessary to provide a complementary arrangement such as that illustrated, that is to say, formed of an arm 81 mounted on the axle of the lower feeder to which is secured a pulley 82. At the other extremity the arm carries, in free rotation, a pulley 83 on which is wound a belt 84, driven by the drive pulley 82, in the direction of arrow c. Tensioning pulleys 85 are suitably disposed in the median portion of the arm 81.

This arm 81 is maintained in contact with the film by a spring 86, attached to the casing and to a connecting rod 87 affixed to the arm. Furthermore, the arm 81 or the connecting rod is connected to the arm 69 by a cable 88 wound on a tensioning wheel 89. This connection permits, at the beginning of rewinding, facilitated passage of the film under the belt 84 by tension of the cable with a force slightly greater than that of the spring 86. As the winding diameter of the film diminishes, the cable relaxes and the spring assures continued bearing of the belt 84 on the film which is substantially driven at the same speed as the pulley 74.

It is to be further noted that the reel 90 as illustrated in FIG. 21 has an external flange 90a greater than the interior flange 90b in order to block the passage between it and its casing 91 to prevent lateral exit of the film.

Of course, the belt 78, with its fingers can easily be mounted in place of the toothed belt described previously.

Clearly, a number of variations can be made by one skilled in the art without departing from the framework of the invention.

The following advantages are considered to clearly follow from the description and are summarized hereafter:
simplication of automatic movement;
automatic rewinding by simple locking of the essential control means;
simplification of the mechanisms;

oscillating mounting of the pinions controlling the three movements;

compactness of the apparatus, but with substantial load capacity (reels up to 120 m);

very substantial slow-down speeds by the system of partially toothed pinion and cam with different bosses: one can attain speeds of the order of 3 images per second without any flicker;

positive operation thanks to the diverse measures such as the pawls, the friction devices, the belts and the pinion which are reliable elements;

facility of manufacture of sound or silent projectors from a common base system: only certain elements are modified;

fidelity of projection and particularly quality of sound by the precise speed of the film, whatever the operating circumstances; and correct operation, whatever the diameter of the reels.

What is claimed is:

1. A cinematic projector comprising a reversible drive motor, a drive shaft driven by said drive motor, an internal take-up reel, support means for an external film supply reel, a pivotably mounted control means for transmitting drive from said motor for advancing film between said reels, said control means being movable between first and second positions for drivingly engaging said drive shaft and in said first position transmitting drive from said shaft for forward and reverse drive of the film respectively according to the direction of drive of the drive motor, and in said second position transmitting drive from said shaft which is driven in forward drive by said motor, and operating means drivingly coupled to said control means for engaging the film on said internal reel and rewinding the film on the external reel when the control means is in said second position.

2. A projector as claimed in claim 1 wherein said control means comprises an assembly of pinions in mesh with one another.

3. A projector as claimed in claim 2 wherein said operating means comprises a feed wheel for contacting the film, a drive belt for said wheel, and a drive pulley for driving said belt from said control means.

4. A projector as claimed in claim 1 wherein said control means comprises a pivotable plate, two trains of pinions opposed with respect to the pivot axis of said plate, one pinion in each train cooperating alternatively with said shaft, threaded sleeves with reverse direction of threading on said shaft for respectively engaging said one pinion of said trains, and a central pinion mounted on the pivot axis for meshing with said one pinion and adapted according to its direction of rotation to drive either the internal reel or the external reel.

5. A projector as claimed in claim 4 comprising a pawl for effecting alternate drive of the reels from said central pinion, said pawl being freely sliding in an axial groove provided in the central pinion and having inclined extremities.

6. A projector as claimed in claim 5 wherein said control means further comprises a first pulley on said pivot axis of said plate selectively coupled by said pawl to said central pinion, a pivotal arm for rotatable support of said external reel, an axle supporting said arm, a second pulley integral with a hub mounted on said axle, and a drive belt drivingly connecting said first and second pulleys.

7. A projector as claimed in claim 6 wherein said axle includes a tapered centering portion extending from said hub, said operating means comprising a third pulley on said tapered centering portion and having teeth thereon, said control means further comprising a fourth pulley integral with said hub and spaced from the second pulley, a second drive belt engaging said fourth pulley for driving the external reel in rotation, gear teeth on said hub between said second and fourth pulleys, and a further pinion carried by said arm and engaged with the teeth on the third pulley and on the hub when said control means is in said second position.

8. A projector as claimed in claim 7 comprising pawl means between said axle and said third pulley for permitting drive from said central pinion via said first and second pulleys and said drive belt to said third pulley with said control means in said second position.

9. A projector as claimed in claim 7 wherein said operating means further comprises an assembly including a follower pulley mounted for free rotation for displacement along a circular groove having its center on the axis of articulation of the pivotal arm, and a sub-assembly comprising a fifth pulley and a friction wheel mounted for displacement relative to the internal reel and a further drive belt drivingly engaging said third pulley, said follower pulley and said fifth pulley and friction wheel.

10. A projector as claimed in claim 9 wherein said further drive belt of the operating means has a smooth face and a face with fine teeth oriented and capable of flattening upon passage on the friction wheel and reforming itself thereafter.

11. A projector as claimed in claim 9 comprising elastic means attached to said internal reel and to said follower pulley for urging the follower pulley towards the center of said internal reel.

12. A projector as claimed in claim 10 wherein said friction wheel is in contact with the film on said internal reel to drive the same when said third pulley is driven, said belt being wound on said friction wheel and said follower pulley such that the teeth on the belt engage the unwound film.

13. A projector as claimed in claim 9 wherein the sub-assembly comprises a slidable plate carrying said friction wheel and said follower pulley, and elastic means acting on said plate and said internal reel for urging the plate towards the center of the internal reel.

14. A projector as claimed in claim 13 comprising a pawl on said slidable plate cooperating with teeth formed on said internal reel and oriented to permit lowering in the direction of descent of the plate and escape in the opposite direction.

15. A projector as claimed in claim 12 comprising means for engaging the film at a location between the friction wheel and the point of contact of the film with the teeth of the belt for avoiding buckling of the film during rewinding, the latter means comprising a second drive system pivotally mounted and driven in rotation from said drive shaft via said control means an disengageable during forward and reverse drive of the film.

16. A projector as claimed in claim 4 wherein one of said train of pinions includes a further pinion coupled to said central pinion and driven by said one pinion which cooperates with said shaft, and adjustable friction means between said one pinion and said further pinion for adjusting the speed of rotation.

17. A projector as claimed in claim 4 wherein for a sound projector having a reading head, said control means further comprises two further trains of pinions engageable with said shaft for driving the film through a projection station and past the reading head with said control means in said first position.

18. A projector as claimed in claim 4 comprising upper and lower film feeders and wherein for a silent projector said control means further comprises a further train of gears driven from said shaft in said first position of the control means to drive said upper feeder, and a belt and pulley arrangement for driving said lower feeder.

19. A projector as claimed in claim 18 wherein said further train of gears comprises a drive pinion engaging said shaft with said control means in said first position, a cam secured to said drive pinion and having, on different portions of its perimeter and on at least a portion of its width, bosses adapted for cooperating with a drive dog for the film and a further pinion secured to said cam having on different portions of its width, teeth of different number in pre-determined relation with said bosses on the cam and an output pinion for driving said upper feeder, said cam and further pinion being axially displaceable, the latter engaging said further pinion in selected positions along its width, for simultaneous adjustment of the rate of drive of the dog, and the speed of drive of the upper feeder.

20. A projector as claimed in claim 4 wherein said control means further comprises an oscillatable arm, pulleys on said arm, a belt wound on said pulleys and having one face constructed to press against the extremity of film unwound from the internal reel by drive of one of said pulleys to cause the film to be pressed against another pulley and to exit from the projector for winding on the external reel.

21. A projector as claimed in claim 20 wherein said another pulley is adjustably mounted in an oblong opening provided in said arm for being urged into constant contact with the unwound film under the action of the tension of the belt.

22. A projector as claimed in claim 20 wherein said one face of said drive belt includes projecting flexible fingers capable of flattening during passage against the film being unwound and sufficiently rigid to push against the extremity of the unwound film.

23. A projector as claimed in claim 20 wherein said arm includes a lever which is engageable to pivot the arm and engage the belt with the film for rewinding, and elastic means acting on the arm to urge the same to a disengaged position for said belt.

24. A projector as claimed in claim 20 wherein the arm is rocked to rewinding position, in which said belt engages the film, by manual action, the projector further comprising an engagement means whereby the arm automatically returns to rest position after completion of the travel of the arm.

25. A projector as claimed in claim 20 comprising a further drive system for unwinding the film including a pivotal lever, a driven pulley on said lever, a second pulley on said lever at an end thereof, a belt wound under tension on said pulleys for transmitting drive to the second pulley, the latter being in contact with the film to drive the film in the direction of unwinding and a spring action on said pivotal lever to urge said second pulley into contact with the film.

26. A projector as claimed in claim 25 comprising a cable connected to said oscillatable arm and to said lever of said further drive system to oppose the action of the spring to allow passage to the exterior of the unwound film and to effect upon commencement of unwinding, a relaxation of the force on the lever, said relaxation being proportional to the diminution of the diameter of the film on the internal reel to permit progressively increased loading of the lever of the further drive system under the action of said spring.

27. A projector as claimed in claim 1 wherein said internal take-up reel is integrally incorporated in said projector, said support means detachably carrying said external film supply reel.

* * * * *